United States Patent

[11] 3,630,575

| [72] | Inventor | Richard T. Fowler |
| | | Redditch, Worcestershire, England |
| [21] | Appl. No. | 839,331 |
| [22] | Filed | July 7, 1969 |
| [45] | Patented | Dec. 28, 1971 |
| [73] | Assignee | Girling Limited |
| | | Tyseley, Birmingham, England |
| [32] | Priorities | July 20, 1968 |
| [33] | | Great Britain |
| [31] | | 34,708/68; |
| | | Sept. 12, 1968, Great Britain, No. 43,356/68 |

[54] COUPLING MEANS FOR HYDRAULIC BRAKE SYSTEMS
2 Claims, 6 Drawing Figs.

[52] U.S. Cl. .................................................. 303/7,
188/3, 188/112, 280/421, 303/49
[51] Int. Cl. ..................................................... B60t 11/24,
B60t 11/20

[50] Field of Search............................................ 303/7, 49;
280/420, 421 X; 188/3, 112

[56] References Cited
UNITED STATES PATENTS

| 2,848,074 | 8/1958 | Puddy ......................... | 188/112 |
| 3,137,369 | 6/1964 | Stromberg................... | 188/112 |

FOREIGN PATENTS

| 310,116 | 12/1955 | Switzerland................. | 188/112 UX |

Primary Examiner—Milton Buchler
Assistant Examiner—John J. McLaughlin
Attorney—Scrivener, Parker, Scrivener and Clarke ABSTRACT: The tractor part of a coupling between the braking systems of a tractor and trailer is an auxiliary piston and cylinder, the cylinder carrying a safety member which prevents movement of the piston in the brake-applying direction when the coupling is disconnected and forms part of the means for connecting the coupling.

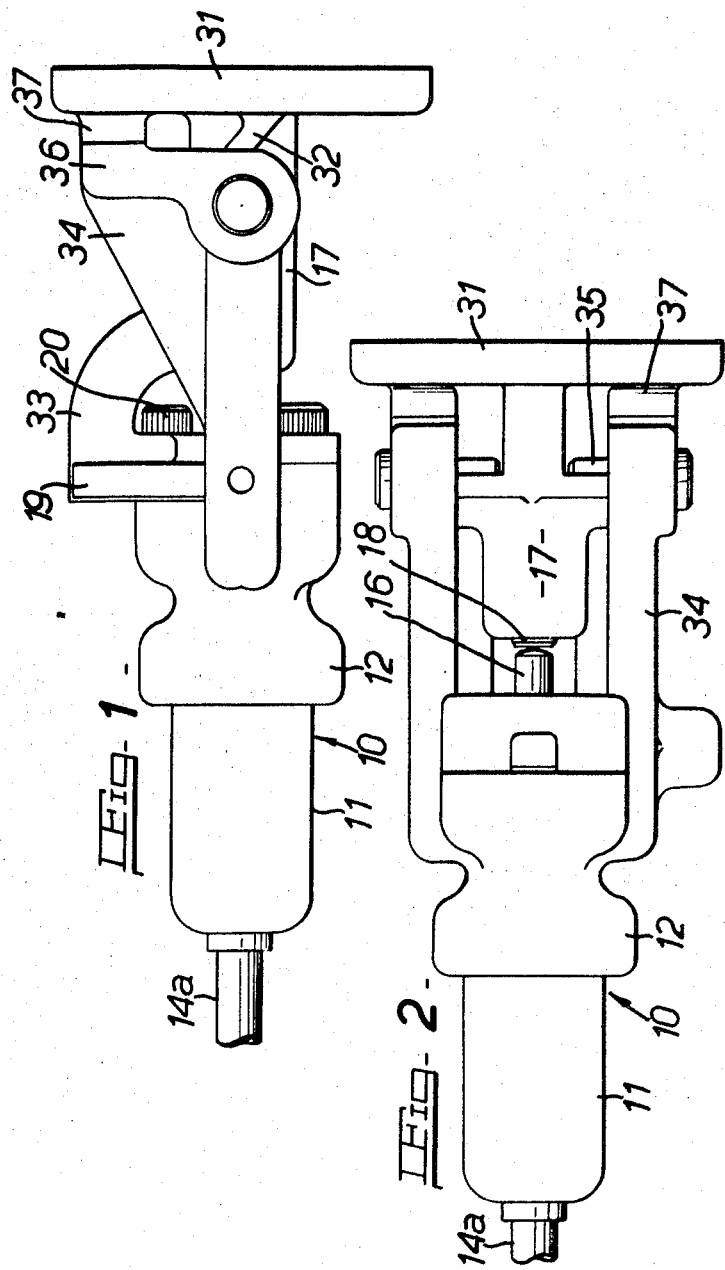

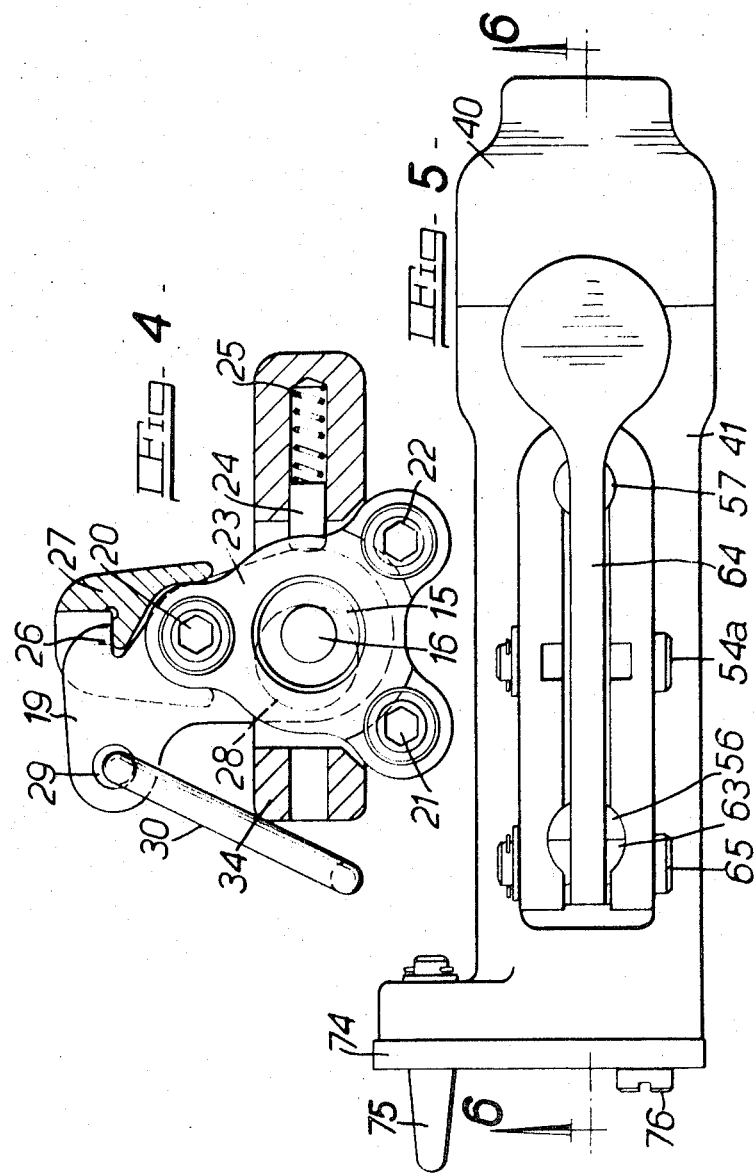

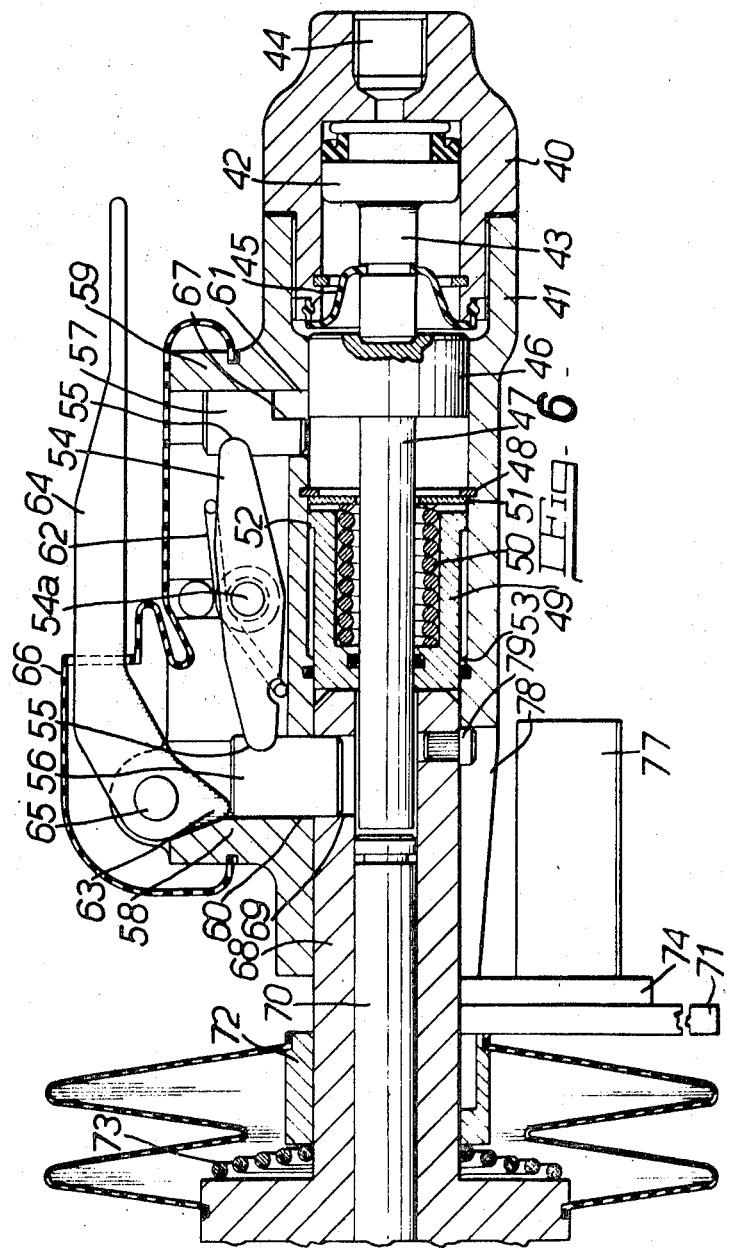

COUPLING MEANS FOR HYDRAULIC BRAKE SYSTEMS

This invention relates to improvements in means for coupling a braking system of a towing vehicle such as a tractor to a braking system of a towed vehicle such as a trailer.

A known type of coupling applied to hydraulic systems comprises an auxiliary piston and cylinder connected to the tractor braking system and the master cylinder and piston of the trailer braking system. When the two cylinders are coupled together, usually by a screwed union nut, the piston rods abut each other so that movement of the auxiliary piston on the tractor is transmitted to the master piston on the trailer.

This type of coupling has two disadvantages. Firstly when the coupling is disconnected, movement of the auxiliary piston is unrestricted and secondly aligning the coupling and screwing the union is an unsatisfactory operation.

It would be preferable to overcome both these disadvantages by incorporating a single mechanism in the coupling so that disconnecting the coupling automatically restricts the movement of the tractor auxiliary piston and connecting the coupling automatically frees the auxiliary piston.

According to the invention the tractor part of the coupling comprises an auxiliary piston and cylinder and the auxiliary cylinder carries a manually operated safety member which prevents movement of the auxiliary piston in the brake-applying direction when the coupling is disconnected.

Also the safety member may form part of the means connecting the auxiliary cylinder to the trailer part of the coupling.

Conveniently the auxiliary piston rod is stepped having a portion of reduced diameter remote from the piston and the step abuts the safety member when the coupling is disconnected.

It will be appreciated that coupling means according to the invention are adaptable to connect any type of braking system. However two embodiments of such coupling means for connecting the hydraulic brakes of a tractor to the hydraulic brakes of a trailer are illustrated by way of examples in the accompanying drawings in which:

FIG. 1 is a side view of a tractor auxiliary cylinder on the left coupled to a trailer master cylinder on the right;

FIG. 2 is an inverted plan view of FIG. 1;

FIG. 4 is a view on the lines 4—4 in FIG. 3;

FIG. 5 is a plan view of modified auxiliary cylinder; and

FIG. 6 is a view along the lines 6—6 of FIG. 5 when the auxiliary cylinder is coupled to the master cylinder of a trailer.

Figure 3:
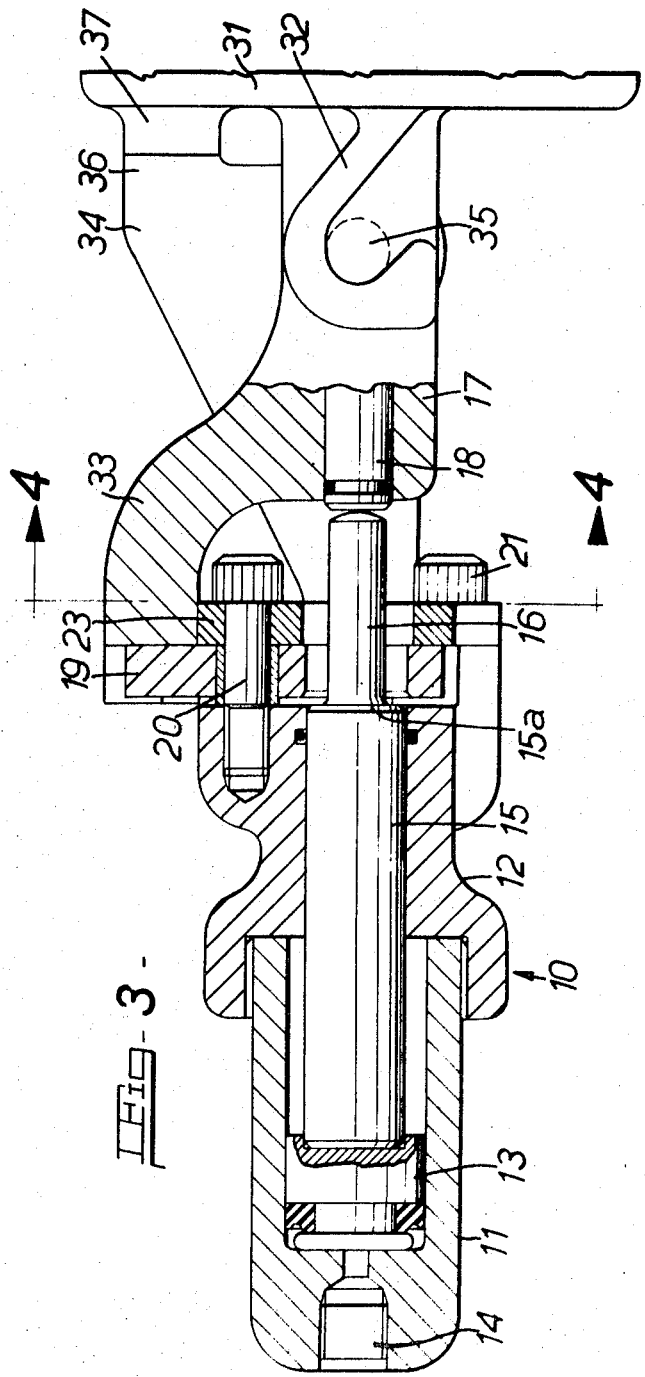
FIG. 3 is an enlarged longitudinal section through FIG. 1.

The mechanical details of the first embodiment of the invention are described with reference to FIGS. 1 to 4. The tractor auxiliary cylinder 10 is formed by two housings 11 and 12 which are screwed together. Working in the housing 11 is a sealed piston 13 exposed to the hydraulic fluid from the tractor master cylinder (not shown) which enters through the inlet 14 via the pressure hose 14a. From the piston 13 a piston rod 15 extends axially through and projects beyond the open end of housing 12. The rod 15 is stepped having a portion 16 of reduced diameter at the end remote from the piston 13 when the tractor auxiliary cylinder 10 is coupled to the trailer master cylinder 17, portion 16 of piston rod 15 abuts the end of a rod 18 which extends from the piston (not shown) working in the cylinder 17.

Although not shown in FIG. 3, a spring may be fitted around the piston rod 15, between the piston 13 and the housing 12, in order to return the piston 13 after an application of the brakes. Normally a return spring acting on the piston in the trailer master cylinder will be sufficient to return both pistons.

A safety member or latch plate 19 is pivotally mounted on a pin 20 which is screwed into the open end of the housing 12. Pin 20 is the uppermost pin of three triangularly spaced pins 20, 21 and 22 which hold a latch-locating plate 23 on to the open end of housing 12 and on the outer side of latch plate 19. Both the latch locating plate 23 and latch plate 19 have a central hole which corresponds to the bore of housing 12 and through which the piston rod 15 can pass. When the coupling is unassembled, the latch plate 19 is biassed to an offset position with respect to the bore of the housing 12 by a plunger 24 loaded by a coil spring 50. The dotted line 28 in FIG. 4 shows the position of the hole in the latch plate 19 when offset and in this position the step 15a in the piston rod 15 abuts the latch plate 19 so that the piston is prevented from moving outwardly, i.e. in the brake-applying direction.

Above the pivot pin 20, the latch plate 19 has a latch portion 26 in the form of a hook which is adapted to cooperate with a keeper portion 27 on the trailer part of the coupling. When the coupling is assembled and the hook 26 is engaged with the keeper 27, the hole in the latch plate 19 is aligned with the bore of the housing 12 and with the hole in the latch-locating plate 23 so that the piston rod 15 is free to move outwardly when the tractor brakes are applied. The clearance between the piston rod 15 and the circumference of the hole in the latch plate 19 is small so that when the brakes are applied, the latch plate 19 cannot pivot to disconnect the coupling. An eye 29 is formed in the latch plate 19 above the pivot pin 20 and in the side of the plate opposite the plunger 24 and spring 25. The eye 29 carries a ring 30 for pulling the hook 26 free against the biassing force of spring 25.

The master cylinder 17 of the trailer braking system is mounted on a plate 31 for attachment to the trailer. A hooked-shaped recess 32 is formed on each side of the cylinder 17 and an arched member 33 projects up from cylinder 17 and outwardly over the piston rod 18. The free end of member 33 carries the keeper 27 for the hook 26. An arm 34 extends outwardly from each side of the housing 12 on the tractor part of the coupling and each of the arms 34 carries an inwardly projecting lug 35 which is adapted to engage with a recess 32. To connect the coupling, the tractor auxiliary cylinder 10 is held vertically below the trailer master cylinder 17 and the lugs 35 are located in the recesses 32. Then the cylinder 10 is moved to the horizontal position and hook 26 is engaged with keeper portions 27. In this position the free ends 36 of the arms 34 abut raised bosses 37 on the plate 31 and the reduced end 16 of piston rod 15 abuts piston rod 18, the full travel of the auxiliary piston 13 being available to apply the trailer brakes.

To disconnect the coupling, the trailer brakes must be released so that the auxiliary piston 13 has returned to its off position. Then the hook 26 is freed from the keeper piston 27 by a pull on ring 30 and the auxiliary cylinder 10 is lowered through 90° to remove the lugs 35 from the recesses 32.

FIGS. 5 and 6 show another embodiment of the invention in which the tractor auxiliary cylinder 40 has an extension housing 41 screwed on to it. A sealed piston 42 working in the auxiliary cylinder 40 has a piston rod 43 extending in a direction away from the hydraulic fluid inlet 44. The piston rod 43 carries a flexible skirt 45 for preventing dust entering the auxiliary cylinder 40 and the free end of the rod 43 abuts the enlarged head 46 of a push rod 47 which forms a stepped extension to the piston rod 43 and which is axially movable in the bore of housing 41. Outward movement of the push rod 47 in the brake-applying direction is limited by a circlip 48 which is set in the bore of the housing 41 and acts as a stop for the head 46.

A sleeve 49 is slidably mounted on the push rod 47. The bore of the sleeve 49 is enlarged at its inner end, i.e. the end facing the auxiliary cylinder 40, in order to house a coil spring which acts between the outer end of the sleeve 49 and a washer 51 that abuts the circlip 48. The inner end of the sleeve 49 is formed with a peripheral flange 52 which is adapted to limit outward movement of the sleeve by cooperating with a step 53 in the bore of the housing 41.

A safety member comprising lever 54 is pivotally mounted on the housing 41 by a pin 54a centrally located on the longitudinal axis of the lever 54 which is parallel to the axis of the housing 41. Each end of the lever 54 is pivotally located in a recess 55, one in a plunger 56 near the open end of the housing 41 and the other in plunger 57 near the inner end of the housing 41. The plungers 56, 57 are guided by guides 58, 59 for movement in openings 60, 61 through the wall of the housing 41 and the lever 54 is loaded by spring 62 so that the plunger 57 is biassed towards its lower position where it projects into the bore of the housing 41. In order to pivot the lever 54 against the bias of spring 62 a conically shaped end 63 projecting at right angles from a hand lever 64 engages the top of plunger 56. The lever 64 is pivotally mounted on the housing 41 by a pin 65 passing through the base of its conical end 63 so that when the lever 64 is horizontal, the apex of the conical end 63 forces the plunger 56 to its lower position. A flexible boot 66 is arranged to fit over the safety member in order to keep the moving parts dirt-free.

When the coupling is unconnected, the lever 64 is vertical, allowing the spring 62 to rock lever 54 so that plunger 57 is in its lower position. A shoulder 67 on the plunger engages with the head 46 of the push rod 47. In this position neither pushrod 47 nor piston rod 43 can move in the brake applying direction. Also coil spring 50 holds flange 52 on sleeve 49 against step 53 in the bore of housing 41 and in this position the sleeve 49 covers the opening 60 so that plunger cannot move into the bore of the housing 41. Thus accidental movement of lever 64 cannot disengage plunger 57 from the head 46 and the safety member is maintained in the safe condition. Also the piston 42 is held in a position which will allow it maximum travel in the auxiliary cylinder 40 as soon as the coupling is connected.

To connect the coupling an extended end 68 of the trailer master cylinder (not shown) is inserted into the open end of the housing 41, pushing back sleeve 49 and compressing spring 50. When the spring is fully compressed, an opening 69 in the master cylinder extension 68 lies in the same plane as opening 60 in the housing 41. To ensure that the openings are correctly aligned a groove 78 is provided in the housing 41 which is designed to locate with a grub screw 79 on the end 68 of the trailer master cylinder. In this position lever 64 can be moved to the horizontal, forcing plunger 56 through openings 60, 69 thus connecting the two parts of the coupling and lifting plunger 57 out of engagement with head 46 of push rod 47. The coupling is now connected and operational since push rod 47 is free to transit movement of the auxiliary piston 42 to a rod 70 carried by the piston (not shown) working in the trailer master cylinder.

Both parts of the coupling are provided with cover plates to prevent dirt entering the coupling when it is disconnected. A cover plate 71 is pivotally connected to a collar 72 which is loaded by a spring 73 and which is slidable on the extended end 68 of the trailer master cylinder. A similar cover plate 74 is pivotally connected to the open end of the housing 41. Cover plate 74 has two protruding locating formations 75 and 76 and cover plate 71 has two corresponding recesses. When the two parts of the coupling are aligned, the cover plates 71 and 74 locate each other and can swing away as one member. Furthermore cover plate 74 has an inwardly extending shield 77 which covers the groove 78.

It will be appreciated that though the two embodiments described above are directed specifically to hydraulic braking systems, a coupling in accordance with the invention could be adapted to any type of braking system. Whatever the braking system on the tractor it would be convenient to use an auxiliary piston and cylinder connected in parallel with the tractor brakes, However, the trailer braking system could be a self-contained power system energized by actuating a control valve. In this case the piston of the trailer master cylinder, as described, would be replaced by the actuating member of the trailer braking system.

I claim:

1. Means for coupling a hydraulic braking system of a tractor vehicle to the hydraulic braking system of a trailer vehicle in which a piston working in an auxiliary cylinder connected into the tractor braking system is adapted to actuate a piston in a master cylinder of the trailer braking system when the tractor brakes are applied, the two cylinders being provided with coupling means for detachably securing them together in axial alignment, wherein the piston in the auxiliary cylinder has a stepped piston rod of which the part of reduced diameter extends axially from an open end of the cylinder for engagement with the piston rod in the trailer master cylinder and a pivoted latch plate movable across the open end of the cylinder in a plane at right angles to the axis of the cylinder has an aperture through which the piston rod of the auxiliary cylinder can pass when the latch plate is held in a position into which it is moved when the cylinders are coupled together, the latch plate being automatically moved by spring means into an offset position in which it is engaged by the step in the said piston rod when the cylinders are disengaged whereby axial movement of the piston in the brake-applying direction is prevented.

2. Coupling means as in claim 1, wherein the latch plate is held in the position in which the piston rod of the piston in the auxiliary cylinder can move freely through it by the engagement of a part of the trailer master cylinder with a part of the latch plate when the cylinders are coupled together.

* * * * *